(12) United States Patent
Maikhuri et al.

(10) Patent No.: US 12,499,398 B2
(45) Date of Patent: Dec. 16, 2025

(54) COGNITIVE BEHAVIORAL ANALYSIS FOR EFFICACIOUS PROCUREMENT

(71) Applicant: Dell Products L.P., Round Rock, TX (US)

(72) Inventors: Ajay Maikhuri, Bangalore (IN); Dhilip Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 419 days.

(21) Appl. No.: 18/166,552

(22) Filed: Feb. 9, 2023

(65) Prior Publication Data

US 2024/0273431 A1    Aug. 15, 2024

(51) Int. Cl.
*G06Q 10/0631* (2023.01)
*G06N 3/091* (2023.01)
(Continued)

(52) U.S. Cl.
CPC ....... *G06Q 10/06315* (2013.01); *G06N 3/091* (2023.01); *G06Q 10/087* (2013.01);
(Continued)

(58) Field of Classification Search
CPC .......... G06Q 10/06315; G06Q 10/087; G06Q 30/018; G06Q 30/0605; G06Q 30/0609;
(Continued)

(56) References Cited

U.S. PATENT DOCUMENTS

2006/0053063 A1*  3/2006  Nagar ................ G06Q 30/0282
                                                        705/347

2014/0236942 A1*  8/2014  Li ........................ G06Q 30/02
                                                        707/735
(Continued)

FOREIGN PATENT DOCUMENTS

CN       115860852    *  3/2023

OTHER PUBLICATIONS

Wang, X., Chen, G. (2017). Dependency-Attention-Based LSTM for Target-Dependent Sentiment Analysis. In: Cheng, X., Ma, W., Liu, H., Shen, H., Feng, S., Xie, X. (eds) Social Media Processing. SMP 2017. Communications in Computer and Information Science, vol. 774. Springer, Singapore (Year: 2017).*

*Primary Examiner* — Florian M Zeender
*Assistant Examiner* — Kimberly S. Bursum
(74) *Attorney, Agent, or Firm* — DALY, CROWLEY, MOFFORD & DURKEE, LLP

(57) ABSTRACT

An example method includes: identifying one or more existing parts that match a part to be procured; determining a part quality and readiness score for each of the existing parts; identifying one or more suppliers of the existing parts; determining a supplier trust and opportunity score for each of the suppliers; determining one or more potential procurement decisions for procuring the quantity of the part, wherein the one or more potential procurement decisions include procurement decisions to procure the specified quantity of the one or more existing parts from the one or more suppliers based on the part quality and readiness score for each of the one or more existing parts and the supplier trust and opportunity score for each of the one or more suppliers; and recommending one of the one or more potential procurement decisions as an optimal procurement decision for procuring the quantity of the part.

17 Claims, 9 Drawing Sheets

(51) Int. Cl.
*G06Q 10/0635* (2023.01)
*G06Q 10/087* (2023.01)
*G06Q 30/018* (2023.01)
*G06Q 30/0201* (2023.01)
*G06Q 30/0601* (2023.01)

(52) U.S. Cl.
CPC ....... *G06Q 30/018* (2013.01); *G06Q 30/0605* (2013.01); *G06Q 30/0609* (2013.01); *G06Q 10/0635* (2013.01); *G06Q 30/0201* (2013.01)

(58) Field of Classification Search
CPC ........... G06Q 10/0635; G06Q 30/0201; G06N 3/091; G06N 3/044; G06N 3/08
See application file for complete search history.

(56) References Cited

U.S. PATENT DOCUMENTS

| | | | |
|---|---|---|---|
| 2015/0154537 A1* | 6/2015 | Cai | G06Q 30/0282 705/28 |
| 2023/0177438 A1* | 6/2023 | Gupta | G06F 40/40 705/7.37 |

* cited by examiner

600

| Stemmed term/Original words | Risk/Opportunity | Correlation |
| --- | --- | --- |
| "terror"/terrorism and terrorist | Risk | 0.88 |
| "failur"/failure | Risk | 0.84 |
| "occurr"/occurrence | Opportunity | 0.8 |
| "maritim"/maritime | Risk | 0.8 |
| "disast"/disaster | Risk | 0.79 |
| "bullwhip"/bullwhip | Risk | 0.79 |
| "competitor"/competitor | Opportunity | 0.88 |
| "demand"/demand | Opportunity | 0.76 |
| "mitig"/mitigate and mitigation | Risk | 0.74 |
| "war"/war | Risk | 0.88 |
| "retail"/retail and retailer | Opportunity | 0.71 |
| "insur"/insurance | Risk | 0.7 |
| "natur"/nature and natural | Risk | 0.69 |
| "catastroph"/catastrophy | Risk | 0.68 |
| "uncertain"/uncertain and uncertainty | Risk | 0.67 |
| "substitut"/substitute | Risk | 0.66 |
| "bankruptci"/bankruptcy | Risk | 0.65 |
| "earthquak"/earthquake | Risk | 0.64 |
| "transpar"/transparent and transparency | Opportunity | 0.63 |
| "tsunami"/tsunami | Risk | 0.62 |
| "special economic zone" | Opportunity | 0.78 |
| "reformation" | Opportunity | 067 |
| "gdp growth" | Opportunity | 0.79 |
| "fin invest"/financial investment | Opportunity | 0.8 |
| "digital transformation" | Opportunity | 0.89 |
| "digital adoption" | Opportunity | 0.89 |

FIG. 6

COGNITIVE BEHAVIORAL ANALYSIS FOR EFFICACIOUS PROCUREMENT

BACKGROUND

Advancements in technology are constantly changing the landscape of parts procurement. These technological developments compel parts suppliers to stop producing older, less sophisticated, and less in-demand parts to divert resources to newer, more sophisticated, and more in-demand parts. Taking integrated circuits (ICs) as an example, studies show that the average lifecycle of ICs has decreased by approximately 30% over the last two decades.

Furthermore, there has been an increase in government and regulatory bodies imposing environmental restrictions and policies, as well as mergers and acquisitions or organizational restructuring in recent years, all of which contribute to the inevitable obsolescence of some parts. As a result, part obsolescence is becoming a major concern for organizations that design and manufacture products, such as electronic equipment, as they keep enough stock on hand to avoid shortages and meet customer demand.

Obsolescence is a lack of availability of an item or raw material resulting from statutory and process changes, as well as new designs. Obsolescence deals with the process or condition by which a piece of equipment becomes no longer useful, or a form and function no longer is currently available for production or repair. Implementation of new technology causes older technology to become less supportable because of the diminished availability of parts and suppliers.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, responsive to a request for a procurement recommendation for procuring a quantity of a part, by a computing device, identifying one or more existing parts that match the part and determining a part quality and readiness score for each of the one or more existing parts. The method also includes, by the computing device, identifying one or more suppliers of the one or more existing parts and determining a supplier trust and opportunity score for each of the one or more suppliers. The method further includes, by the computing device, determining one or more potential procurement decisions for procuring the quantity of the part, wherein the one or more potential procurement decisions include procurement decisions to procure the specified quantity of the one or more existing parts from the one or more suppliers based on the part quality and readiness score for each of the one or more existing parts and the supplier trust and opportunity score for each of the one or more suppliers. The method also includes, by the computing device, recommending one of the one or more potential procurement decisions as an optimal procurement decision for procuring the quantity of the part.

In some embodiments, the part is an existing part. In some embodiments, the part is a new part that is not an existing part.

In some embodiments, the part quality and readiness score is based on one or more of a part quality score, a part lifecycle score, a part consumption score, and a customer feedback score. In one aspect, the method further includes filtering the one or more existing parts based on the part quality and readiness score and a part quality threshold.

In some embodiments, the method further includes training a machine learning (ML) model to understand sentiment conveyed in text and analyzing customer feedback using the trained ML model to determine sentiment conveyed toward the one or more existing parts, wherein the sentiment is used in determining the part quality and readiness score. In one aspect, the ML model includes a Target Dependent Long Short-Term Memory (TD-LSTM) model.

In some embodiments, the supplier trust and opportunity score is based on one or more of a supplier quality score, a supplier future investment score, and a supplier industry position score. In one aspect, the method further includes filtering the one or more suppliers based on the supplier trust and opportunity score and a supplier quality threshold.

In some embodiments, the method further includes training a machine learning (ML) model using a document term matrix to understand financial and investment information in text and analyzing analytical research data publications using the trained ML model to predict a risk assessment of each of the one or more suppliers, wherein the risk assessment is used in determining the supplier trust and opportunity score. In some embodiments, the method also includes using the trained ML model to predict an ethical behavior of each of the one or more suppliers, wherein the ethical behavior is used in determining the supplier trust and opportunity score. In one aspect, the ML model includes a Target Dependent Long Short-Term Memory (TD-LSTM) model.

In some embodiments, identifying one or more existing parts is by applying a learning algorithm and a distance measure. In one aspect, the learning algorithm includes a k-nearest neighbor (k-NN) algorithm and the distance measure include a Euclidean distance.

In some embodiments, recommending one of the one or more potential procurement decisions as the optimal procurement decision includes simulating impact of the one or more potential procurement decisions on procurement variables and relationships between the procurement variables.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 6 illustrates a portion of an example document term matrix, in accordance with an embodiment of the present disclosure.

DETAILED DESCRIPTION

Figure 1:
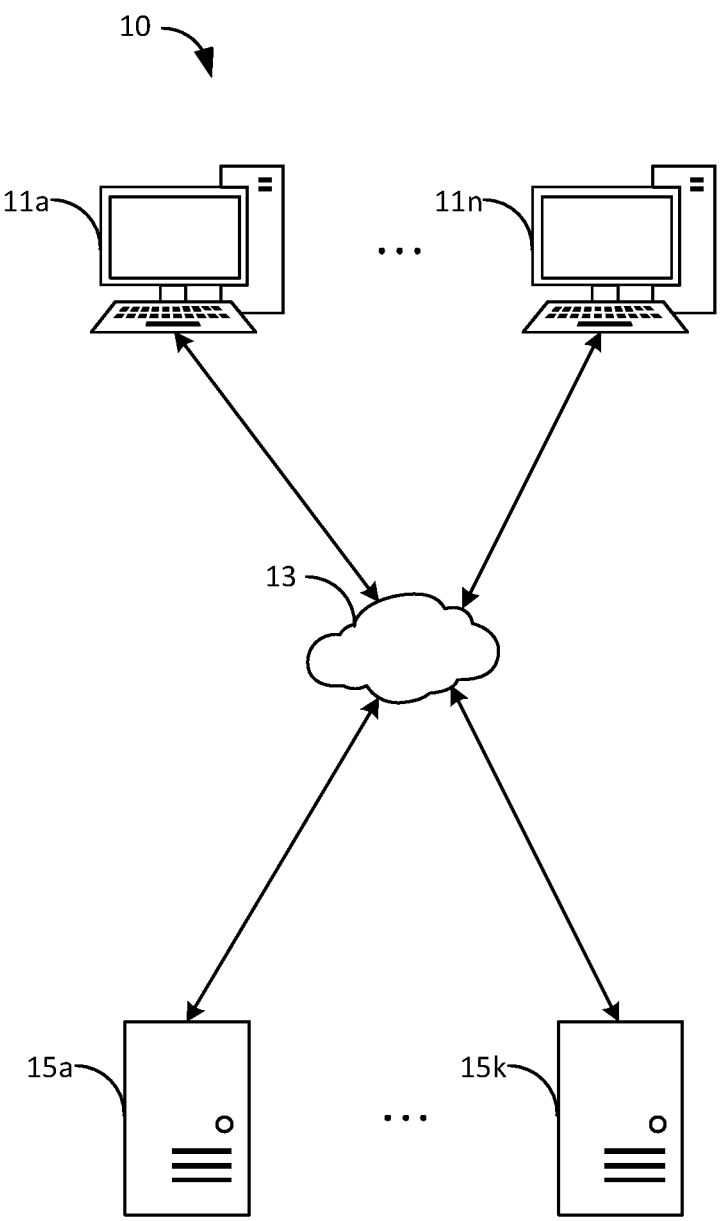
FIG. 1 is a diagram illustrating an example network environment of computing devices in which various aspects of the disclosure may be implemented, in accordance with an embodiment of the present disclosure.

Obsolescence is a major issue in any type of electronic equipment. For example, it is quite common for some parts (or "components") to become obsolete before the service life of the product. As a result, organizations that design and manufacture products, such as electronic equipment, to maintain enough parts stock on hand to avoid shortages and to meet customer demand for their products.

In accordance with the various embodiments of the concepts, techniques, and structures disclosed herein, it is appreciated that a variety of factors other than technological advancement may cause parts for which an organization maintains an inventory to become obsolete. For example, parts may become obsolete due to part supplier organizations' financial health. Supplier organizations may also stop offering service and support of their parts due to outdated technology, poor performance, rising costs compared to alternatives, and a desire to remain competitive in the market. As a result, manufacturing organizations may be forced to cease production of a product if there are insufficient usable supplies for a part needed to produce the product. For example, a laptop manufacturer may face production setbacks and delays due to the obsolescence of a part and risk losing revenue. To avoid or minimize the loss, it is important for an organization that manufactures products to identify such parts well in advance, notify the planner and buyer to stop planning, negotiating, and procuring such parts, and instruct the production manager at the factory to prioritize leveraging inventory of such parts in the manufacturing of the products.

Currently, organizations evaluate suppliers using manual processes or predefined rules that lack insight. Use of such simple approaches to award business to suppliers is inefficient in that the organizations may continue to award business to suppliers who lack a clear, futuristic vision to innovate and remain competitive in the market, suppliers with poor financial health or who are close to insolvency, and/or suppliers who fail to adhere to ethical practices. Similarly, organizations currently identify obsolete, potentially obsolete, defective, or underperforming parts either manually or based on predefined rules that lack insight. Organizations using such simplistic approaches may fail to prioritize the use of potentially obsolete parts and/or continue to leverage defective or underperforming parts. These organizations may also continue to plan, negotiate, and procure potentially obsolete, defective, or underperforming parts. Inefficient or incorrect supplier selection for a procurement can negatively impact an organization's customer satisfaction and brand loyalty. For example, use of obsolete or underperforming parts in a product will affect the life of the product. Also, suppliers who lack financial stability or do not adhere to ethical practices can abruptly cease production of parts, which directly impacts the production of products that use such parts.

Certain of the embodiments disclosed herein provide an intelligent procurement recommendation module that recommends one or more suppliers for a procurement. The recommendation module, according to some embodiments, provides a rational procurement recommendation based on analysis of procurement behaviors. The procurement behavior analysis may entail analyses of parts (sometimes referred to herein as "part analysis") and analyses of suppliers (sometimes referred to herein as "supplier analysis") to provide the rational procurement recommendation. In brief, part analysis may entail, determining the quality of the parts that are being used or have been used in the past by an organization. Such analysis allows the organization to determine whether to continue using the part, cease purchasing the part, or invest in alternatives (e.g., find another part). Supplier analysis may entail determining the quality of the suppliers (i.e., the suppliers supplying or providing the parts) that are being used or have been used in the past by the organization. Such analysis can assist the organization in deciding whether to build or maintain long-term strategic partnership with a supplier or whether the organization needs to end the relationship to avoid risk in the future. The dynamic behaviors of the procurement arrived through the part analysis and supplier analysis can be analyzed to determine an optimal procurement decision.

In some embodiments, part analysis may consider various factors such as customer feedback about a part, part performance analysis, part lifecycle analysis, and part consumption analysis. Some embodiments can use a machine learning model trained or configured by sentiment data about the part to classify customer feedback (e.g., positive, neutral, negative) regarding the part. For example, sentiment data about a part can be collected from forums, blogs, microblogs, posts, research papers, and other text commonly used for providing product feedback. Once trained, the trained machine learning model can, in response to input of a text, predict a sentiment conveyed towards the part in the text.

Part performance analysis may include identifying underperforming and/or faulty parts. An organization can, for example, determine whether a part is underperforming or defective from the telemetry data or the service tickets. If a part is underperforming or defective, the organization can request that the supplier of the part resolve the issue with the existing part and return the purchased stock of such parts to the supplier. If the problem cannot be fixed, the organization can request a replacement with an alternate part from the supplier. If the supplier does not have replacement parts, the organization can award the contract to a different supplier for the same part.

Part lifecycle analysis may include monitoring lifecycles of the parts. Every part passes through its own life cycle stages. A part's lifecycle can be monitored to determine if the part is aging and the supplier that is supplying the part has no plans to upgrade the again part. In such cases, the organization can identify an alternative part from the same or a different supplier, reduce the procurement of the existing part, and gradually increase the procurement of the alternative part.

Part consumption analysis may include analyzing the available supply and consumption rates of the parts. Such part consumption analysis enables the organization to prioritize the utilization of potentially obsolete and low-consumption parts over other parts (e.g., over non-obsolete and non-low-consumption parts). As a result, future financial loss may be prevented. Part consumption analyses can aid in maintaining the optimal amount of inventory without wastage or minimal wastage.

In some embodiments, supplier analysis may consider various factors such as supplier position in the industry, supplier future investment, and supplier part consumption analysis. In some embodiments, for a particular supplier, supplier position in the industry may include monitoring the financial health of the supplier and the ethical behavior of the supplier. There is a risk to the organization if it continues to do business with a supplier that is in poor financial health and/or that engages in unethical practices. Monitoring the supplier's financial health can aid in deciding whether to terminate a relationship with the supplier if the supplier has poor financial health or is approaching insolvency. Monitoring the supplier's ethical behavior can aid in determining whether the supplier engages in unethical practices such as child labor, unsafe and unhygienic working conditions, corruption, or inadequate pay and working hours. Some embodiments can use a trained machine learning model to predict financial and ethical risk associated with a supplier. For example, training data can include supply chain risk management data collected from regional and global journals, articles, and other types of publications that provide analytical research data, such as BLOOMBERG and ISH MARKIT, and information provided by various certification authorities/bodies. The training data can be used to train the machine learning model to predict various risks associated with a supplier.

Supplier future investment may include identifying strategic suppliers and identifying suppliers with stale technologies. Investing with a strategic supplier who continually invests in futuristic technologies to improve their parts and optimize the cost of production of the parts can result in additional cost savings for the organization. Avoiding relationships with suppliers that continue to employ obsolete technologies and have no plans to invest in innovative technologies can also result in additional cost savings for the organization.

Supplier part consumption analysis may include monitoring the capacity of suppliers. For instance, if a supplier's capacity falls short of their commitments, it may be risky to continue doing business with the supplier.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to as a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
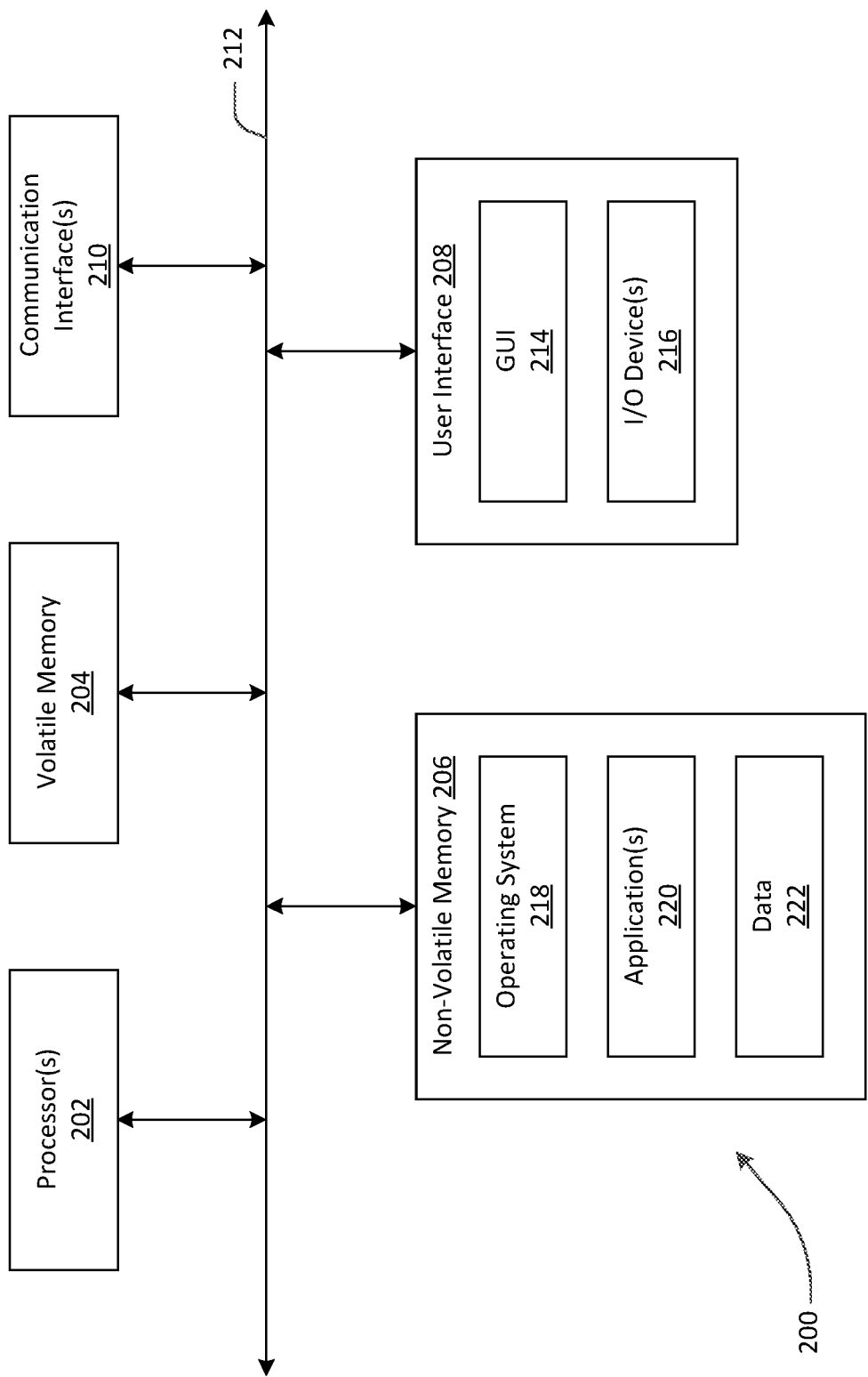
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 9). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
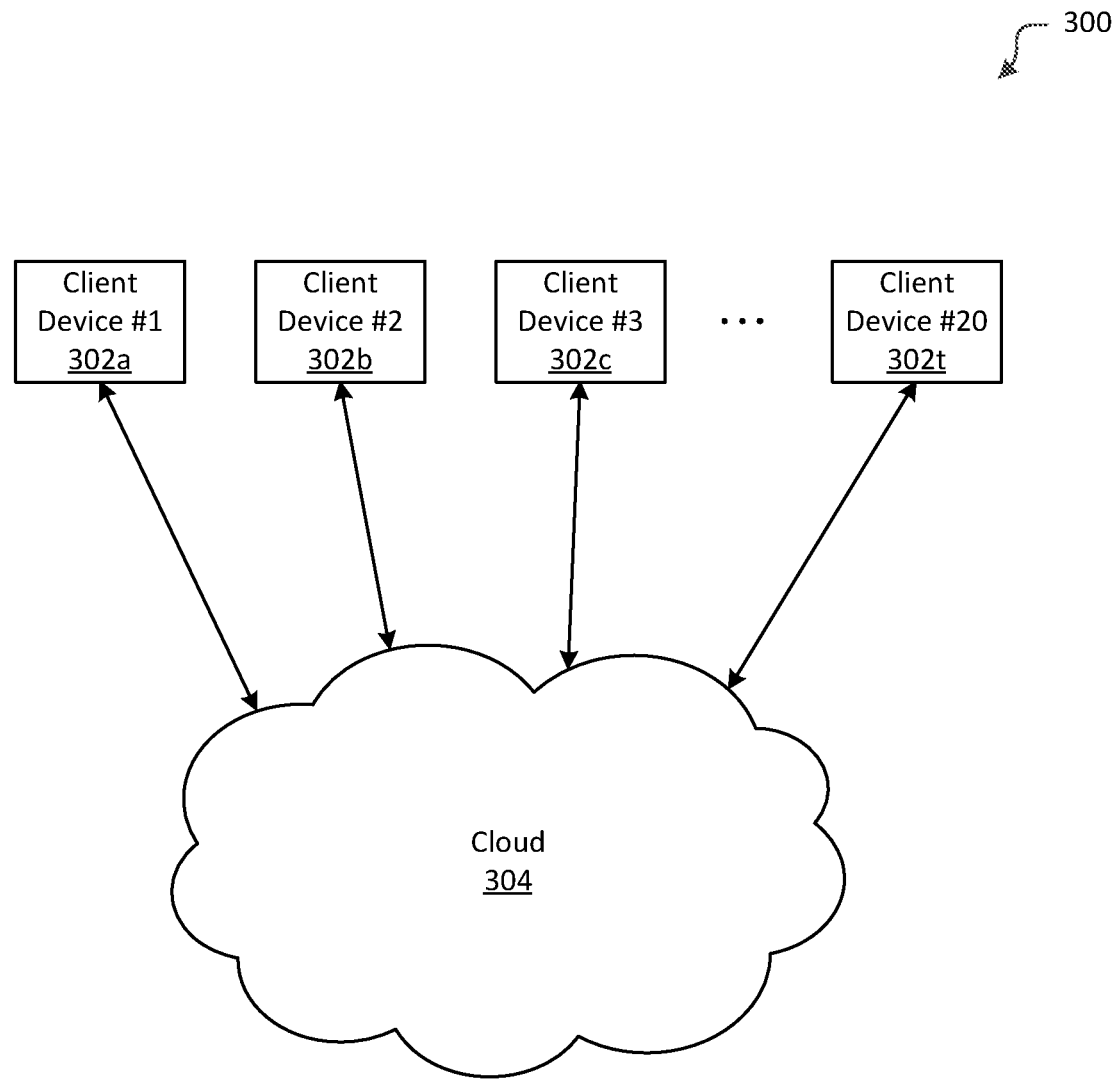
FIG. 3 is a diagram of a cloud computing environment in which various aspects of the concepts described herein may be implemented.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (Saas), Platform as a Service (PaaS), Infrastructure as a Service (IaaS), and/or Desktop as a Service (DaaS), for example. IaaS may refer to a user renting the use of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
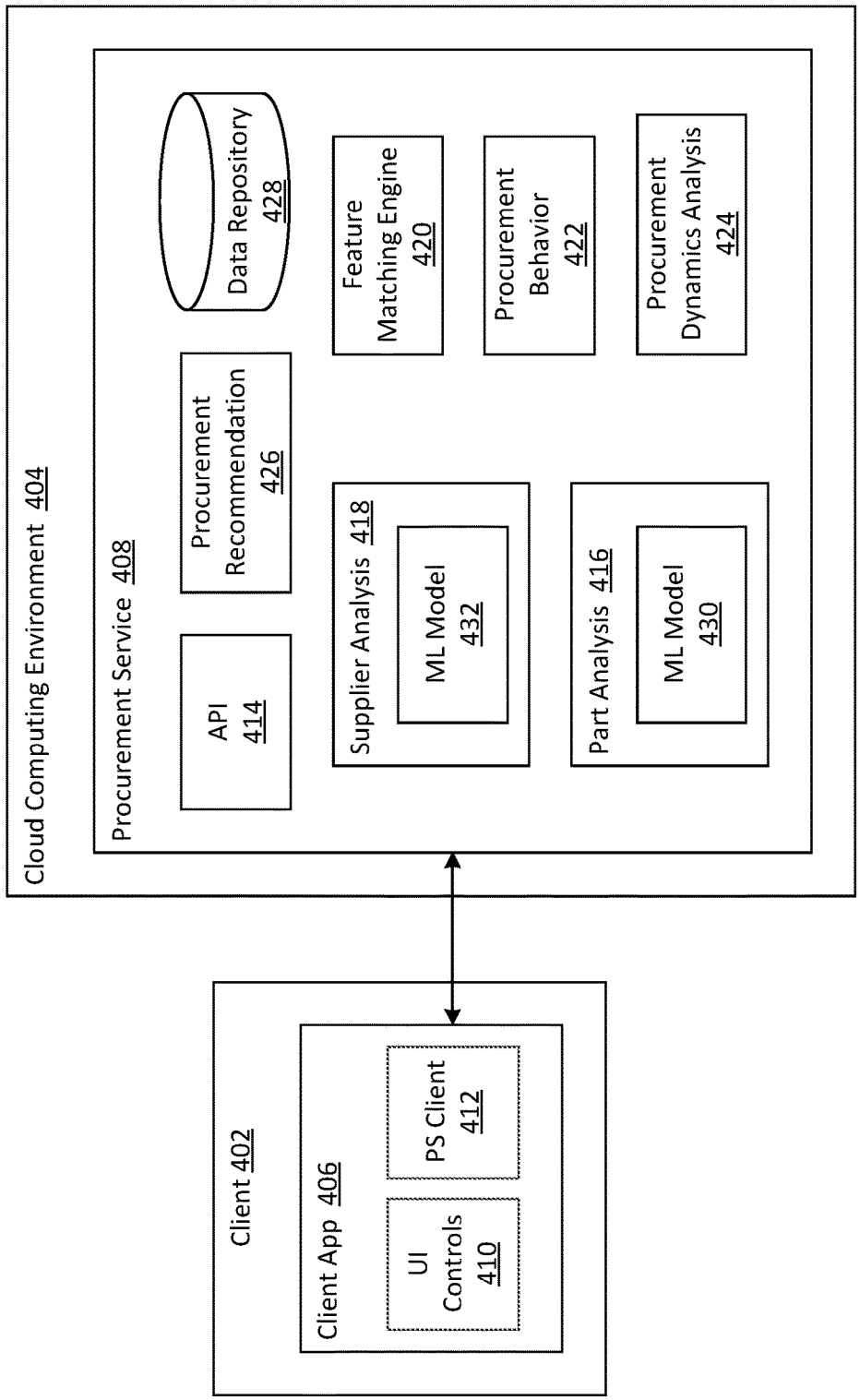
FIG. 4 is a block diagram of an illustrative system for efficacious procurement of parts, in accordance with an embodiment of the present disclosure.

FIG. 4 is a block diagram of an illustrative system 400 for efficacious procurement of parts, in accordance with an embodiment of the present disclosure. Illustrative system 400 includes a client application 406 operable to run on a client 402 and configured to communicate with a cloud computing environment 404 via one or more computer networks. Client 402 and cloud computing environment 404 of FIG. 4 can be the same as or similar to client 11 of FIG. 1 and cloud computing environment 300 of FIG. 3, respectively.

As shown in FIG. 4, a procurement service 408 can be provided as a service (e.g., a microservice) within cloud computing environment 404. Client application 406 and procurement service 408 can interoperate to provide efficacious procurement recommendations for procurements of quantities of parts, as variously disclosed herein. To promote clarity in the drawings, FIG. 4 shows a single client application 406 communicably coupled to procurement service 408. However, embodiments of procurement service 408 can be used to service many client applications (e.g., client applications 406) running on client devices (e.g., clients 402) associated with one or more organizations and/or users. Client application 406 and/or procurement service 408 may be implemented as computer instructions executable to perform the corresponding functions disclosed herein. Client application 406 and procurement service 408 can be logically and/or physically organized into one or more components. In the example of FIG. 4, client application 406 includes UI controls 410 and a procurement service (PS) client 412. Also, in this example, procurement service 408 includes an application programming interface (API) module 414, a part analysis module 416, a supplier analysis module 418, a feature matching engine 420, a procurement behavior module 422, a procurement dynamics analysis module 424, a procurement recommendation module 426, and a data repository 428.

The client-side client application 406 can communicate with the cloud-side procurement service 408 using an API. For example, client application 406 can utilize PS client 412 to send requests (or "messages") to procurement service 408 wherein the requests are received and processed by API module 414 or one or more other components of procurement service 408. Likewise, procurement service 408 can utilize API module 414 to send responses/messages to client application 406 wherein the responses/messages are received and processed by PS client 412 or one or more other components of client application 406.

Client application 406 can include various UI controls 410 that enable a user (e.g., a user of client 402), such as a procurement manager or other associate within or associated with an organization, to access and interact with procurement service 408. For example, UI controls 410 can include UI elements/controls, such as a list box and a text box, that a user can use to select an existing part from a list of existing parts and enter (e.g., specify) a quantity (e.g., number of units) of the selected existing part that is to be procured. UI controls 410 may also include UI elements/controls, such as input fields and text fields, that a user can use to enter (e.g., specify) a new part (e.g., a description or an ID of a new part) and a quantity of the specified new part that is to be procured. A new part may be a part that has not been previously procured by the organization (e.g., not an existing part). UI controls 410 may further include additional UI elements/controls that a user can use to enter (e.g., specify) information about the features of the new part, such as feature configuration and region information (e.g., information about the region in which the new part is being procured), among others. As an example, in the case where the part is a processor (e.g., a CPU), the features may include socket type, clock speed, host-bus speed, and cache size, among others. As another example, in the case where the part is a motherboard, the features may include form factor or size, CPU socket, chipset, USB ports, RAM slots, and video connector ports, among others. In some implementations, some or all the UI elements/controls can be included in or otherwise provided via one or more electronic forms configured to provide a series of fields where data is collected, for example. UI controls 410 can include UI elements/controls that a user can click/tap to request a procurement recommendation for the specified quantity of the part. In response to the user's input, client application 406 can send a message to procurement service 408 requesting a procurement recommendation for procuring the specified quantity of the part.

Client application 406 can also include UI controls 410 that enable a user to view a procurement recommendation. For example, in some embodiments, responsive to sending a request for a procurement recommendation for procuring a quantity of a part, client application 406 may receive a response from procurement service 408 which includes a procurement recommendation detailing one or more suppliers from whom to procure the part and a quantity of the part to procure from the one or more suppliers. For example, suppose a request is for a procurement recommendation for procuring 300 units of a Part G, which may be an existing part or a new part. In this example, a procurement recommendation may specify to procure 200 units of Part G from a Supplier X and 100 units of Part G from a Supplier Y. UI controls 410 can include a button or other type of control/element for displaying a procurement recommendation for procuring a quantity of a part, for example, on a display connected to or otherwise associated with client 402.

In the embodiment of FIG. 4, client application 406 is shown as a stand-alone client application. In other embodiments, client application 406 may be implemented as a plug-in or extension to another application (e.g., a web browser) on client 402, such as, for example, an enterprise client application. In such embodiments, UI controls 410 may be accessed within the other application in which client application 406 is implemented (e.g., accessed within the enterprise client application).

Referring to the cloud-side procurement service 408, part analysis module 416 is operable to determine the quality of the parts that are being used or have been used in the past by the organization. Such parts are referred to herein as "existing parts." This enables the organization to identify the existing parts whose quality is below an acceptable part quality threshold. Determining the quality of existing parts can allow the organization to continually analyze the individual existing part's planning, negotiation, procurement, and inventory strategies. In some embodiments, quality of an existing part may be determined by various factors such as feedback about the existing part from customers, performance of the existing part, lifecycle of the existing part, and consumption of the existing part.

According to one embodiment, performance of an existing part may be based on a part quality index that is based on numbers of the existing part that are defective and underperforming. The number of the existing part that are defective can be determined from the service tickets that are received for the existing part. The number of the existing part that are underperforming can be determined using telemetry data received for the existing part. The part quality index of an existing part can then be computed as follows:

$$\text{Part Quality Index} = \frac{\text{Total Defective} + \text{Total Underperforming}}{\text{Total Part Quantity}}.$$

For example, suppose 500 units of an existing Part A was in use during the past month, July, 15 units of Part A is determined to be underperforming during July based on the received telemetry data, and 5 units of Part A is determined to be defective in July based on the received service tickets. In this example, the part quality index of Part A for July can be computed to be 0.04 (20÷500=0.04).

Part analysis module 416 can generate part quality scores for the different existing parts. In some embodiments, for a particular existing part, part analysis module 416 can generate a part quality score of the existing part based on its part quality index. Part analysis module 416 can store (e.g., record) the part quality scores of the existing parts within data repository 428, where it can subsequently be retrieved and used. In some embodiments, data repository 428 may correspond to a storage service within the computing environment of procurement service 408.

According to one embodiment, lifecycle of an existing part may be based on an end-of-life date of the existing part. For instance, if a period to the end-of-life of a part is long, it can be determined that the part is in the introduction stage of its lifecycle. Conversely, if a period to the end-of-life of a part is short, it can be determined that the part is in the decline stage of its lifecycle. The end-of-life date of an existing part may be based on a manufacturing date and an average life of the existing part, and can be computed as follows:

$$\text{End of Life} = \text{Manufacturing Date} + \text{Average Life}.$$

For example, suppose the manufacturing date of an existing Part B is 1 Jul. 2022 and the average life of Part B is 1,825 days. In this example, end-of-life date of Part B can be computed to be 30-June 2027 (1 Jul. 2022+1,825 days=30 Jun. 2027). Note that Product Discontinuation Notifications (PDNs), Product Change Notifications (PCNs), and Last Time Buy (LTB) may influence the end-of-life date of existing parts.

Part analysis module 416 can generate part lifecycle scores for the different existing parts. In some embodiments, for a particular existing part, part analysis module 416 can generate a part lifecycle score of the existing part based on a current stage in the lifecycle of the existing part. For example, a first part lifecycle score may be assigned to an existing part if it is in the introduction stage of its lifecycle as determined from its end-of-life date, a second part lifecycle score may be assigned to the existing part if it is in the growth stage of its lifecycle, a third part lifecycle score may be assigned to the existing part if it is in the maturity stage of its lifecycle, and a fourth part lifecycle score may be assigned to the existing part if it is in the decline stage of its lifecycle. Part analysis module 416 can store (e.g., record) the part lifecycle scores of the existing parts within data repository 428, where it can subsequently be retrieved and used.

According to one embodiment, consumption of an existing part may be based on a number of units of the existing part consumed (e.g., number of units used) and a rate at which the existing part is being consumed. The number of units consumed and a part consumption rate of an existing part can be computed as follows:

$$\text{Units of Part Consumed} = \text{Beginning Stock of Part} +$$
$$\text{Goods Receipts of Part} - \text{Ending Stock of Part},$$
$$\text{Part Consumption Rate} = \text{Units of Part Consumed}/\text{Total Stock of Part},$$

where Beginning Stock of Part is a number of units of the existing part at the beginning of the computation period, Goods Receipts of Part is a number of units of the existing part received from a supplier(s) during the computation period, Ending Stock of Part is a number of units of the existing part at the end of the computation period, and Total Stock of Part is a total number of units of the existing part that was in stock during the computation period. For example, suppose the computation period is from 1 Jul. 2022 to 31 Jul. 2022 (e.g., the month of July), the beginning stock of an existing Part C on 1 Jul. 2022 is 1,000 units, the goods receipts of Part C during July is 250 units, and the closing stock of Part C on 31 Jul. 2022 is 800 units. In this example, the number of units of Part C consumed during July can be computed to be 450 (1,000+250−800=450) and the part consumption rate of Part C during July can be computed to be 0.36 (450/1,250=0.36).

Part analysis module 416 can generate part consumption scores for the different existing parts. In some embodiments, for a particular existing part, part analysis module 416 can generate a part consumption score of the existing part based on the number of units of the existing part consumed, the part consumption rate of the existing part, or a combination of both the number of units consumed and the part consumption rate. Part analysis module 416 can store (e.g., record) the part consumption scores of the existing parts within data repository 428, where it can subsequently be retrieved and used.

According to one embodiment, feedback about an existing part from customers may be based on analysis of text collected from data sources commonly used for providing product feedback such as, for example, forums, blogs, microblogs, posts, and research papers. The text from such data sources can be analyzed to understand the sentiment, such as worry, happy, satisfied, neutral, sad, or unhappy, among others, expressed in the text toward or directed at an existing part by customers (e.g., users of the existing part). In some cases, this can be accomplished by analyzing the text data to identify the positive or negative intensity of words, phrases, and symbols within the text, punctuation, emojis, less expressive text, and delayed expressive text. For example, suppose the content of a post is as follows:

Device is light weight & fine for light productivity use, schoolwork etc. But manages the heavy workloads. CPU is the good factor understandably OS is good & frequently updated. Screen is average, not that good for movies & photo viewing. Lacks contrast & color depth. Wifi stability could be better.

Based on an analysis of the text in the post, a determination can be made that the poster's (e.g., customer's) sentiment towards the CPU performance is good, and the sentiment towards screen resolution and graphics card is unhappy. Customer feedback (e.g., positive, neutral, negative) about an existing part may be based on the sentiments expressed by the customers towards the existing part in the various data sources (e.g., forums, blogs, microblogs, posts, and research papers). For example, if the majority of the sentiment expressed toward an existing part by the customers is happy and satisfied, it can be determined that the customer feedback toward the existing part is positive. As another example, if the majority of the sentiment expressed toward the existing part by the customers is worry, sad, and unhappy, it can be determined that the customer feedback toward the existing part is negative.

Part analysis module 416 can generate customer feedback scores for the different existing parts. In some embodiments, for a particular existing part, part analysis module 416 can generate a customer feedback score of the existing part based on the customer feedback towards the existing part. Part analysis module 416 can store (e.g., record) the customer feedback scores of the existing parts within data repository 428, where it can subsequently be retrieved and used.

In some embodiments, part analysis module 416 may implement or include a machine learning (ML) model 430 to analyze text to understand (determine) the sentiment conveyed toward the existing part in the text. In embodiments, ML model 430 can include recurrent neural networks, such as Target Dependent Long Short-Term Memory (TD-LSTM) networks, configured to analyze the sentiment conveyed in the text toward a target (e.g., sentiment conveyed in the text towards an existing part). TD-LSTM is an extension to LSTM by incorporating target information. The purpose of target-dependent sentiment analysis is to classify the sentiment of a text towards a given target. That is, in the case where an existing part is mentioned in a sentence, target-dependent sentiment analysis calls for inferring a sentiment polarity (e.g., positive, neutral, negative) of the sentence towards the existing part (i.e., towards the target). According to one embodiment, the TD-LSTM model can be trained from training data collected from forums, blogs, microblogs, posts, research papers, and other text commonly used for providing product feedback. The TD-LSTM model can learn continuous features (representations) without feature engineering while capturing the intricate relatedness among a target, context, and dependent words.

Figure 5:
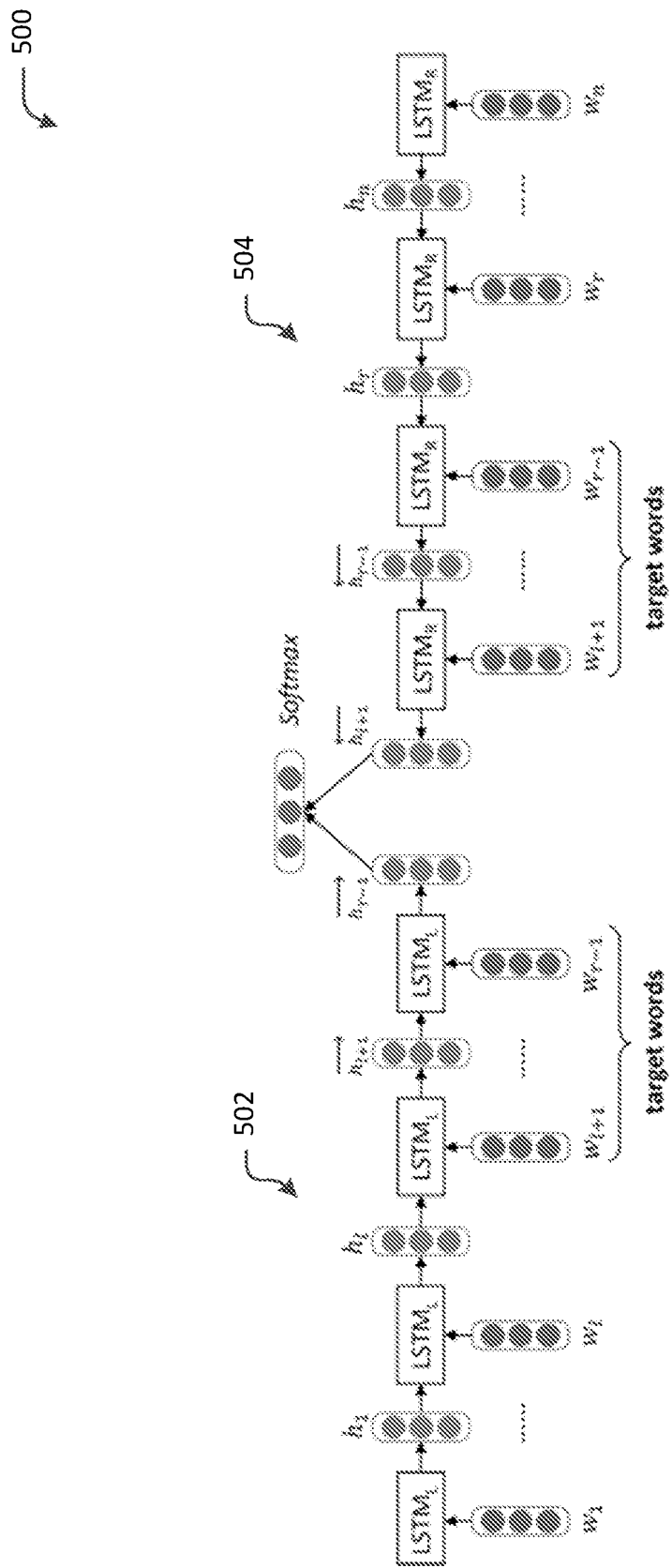
FIG. 5 illustrates a portion of an example Target Dependent Long Short-Term Memory (TD-LSTM) model of the part analysis module of FIG. 4, in accordance with an embodiment of the present disclosure.

A portion of an example TD-LSTM model 500 of part analysis module 416 is illustrated in FIG. 5. As shown, in illustrative TD-LSTM model 500, w stands for word in a sentence whose length is n, $\{w_{l+1}, w_{l+2}, \ldots, w_{r-1}\}$ are target words, $\{w_1, w_2, \ldots, w_l\}$ are preceding context words, and $\{w_r, \ldots, w_{n-1}, w_n\}$ are following context words. In brief, TD-LSTM model 500 models the preceding and following contexts surrounding a target string so that contexts in both the preceding and following directions can be used as feature representations for sentiment classification. As can be seen in FIG. 5, LSTM model 500 includes a left $LSTM_L$ 502 to model the preceding context and a right $LSTM_R$ 504 to model the following context. The input of $LSTM_L$ 502 is the preceding contexts plus the target string, and the input of $LSTM_R$ 504 is the following contexts plus the target string. $LSTM_L$ 502 is run from left to right, and $LSTM_R$ 504 is run from right to left. This allows the target string to be the last unit, which better utilizes the semantics of the target string when using the composed representation for sentiment classification. Afterwards, the last hidden vector $h_{r-1}$ of $LSTM_L$ 502 and the last hidden vector $h_{l-1}$ of $LSTM_R$ 504 can be concatenated and input to a softmax layer to classify the sentiment polarity label. In other embodiments, the last hidden vector $h_{r-1}$ of $LSTM_L$ 502 and the last hidden vector $h_{l-1}$ of $LSTM_R$ 504 can be averaged or summed and input to the softmax layer.

TD-LSTM model 500 can be trained end-to-end in a supervised learning framework. The loss function is the cross-entropy error of sentiment classification as follows:

$$\text{loss} = \sum_{s \in S} \sum_{c=1}^{C} P_c^g(s) \cdot \log(P_c(s)),$$

where S is the training data, C is the number of sentiment categories, s represents a sentence, $P_c(s)$ is the probability of predicting s as class c given by the softmax layer, $P_c^g(s)$ indicates whether class c is the correct sentiment category, whose value is 1 or 0. The derivative of the loss function can be taken through back-propagation with respect to all parameters, and parameters can be updated with stochastic gradient descent.

Referring again to FIG. 4, supplier analysis module 418 is operable to determine the quality of the suppliers that are being used or have been used in the past by the organization to provide the parts. This enables the organization to identify the suppliers whose quality is below an acceptable supplier quality threshold. Determining the quality of a supplier can allow the organization to continually or periodically revise its business award strategy and to consider multiple suppliers for awarding a contract for a part (e.g., for identically shaped and sized parts). As a result, business impact to the organization may be mitigated if any of the suppliers cannot meet their obligations or become bankrupt, for example. In some embodiments, quality of a supplier may be determined by various factors such as position in the industry, future investment, and part consumption analysis.

According to one embodiment, supplier part consumption analysis may be based on supplier performance indicators such as supplier quality index, supplier Advance Shipment Notification (ASN) accuracy, and/or supplier delivery accuracy. The supplier quality index of a supplier may be based on the quantity of a part ordered from the supplier and the quantity of the part received from the supplier. The supplier quality index of a supplier can be computed as follows:

$$\text{Supplier Quality Index} = \text{Good Receipt Quantity}/\text{Purchase Order Quantity},$$

where Good Receipt Quantity is the number of units of a part received from a supplier and Purchase Order Quantity is the number of units of the part ordered from the supplier. For example, suppose 500 units of a Part A is ordered from a Supplier G in July and 400 units of Part A is received from Supplier G. In this example, the supplier quality index of Supplier G for July can be computed to be 0.8 (400÷500=0.8).

The supplier ASN accuracy of a supplier may be based on an ASN from the supplier about an ordered part and the quantity of the part received from the supplier. The ASN accuracy of a supplier can be computed as follows:

$$\textit{ASN} \text{ Accuracy} = \text{Good Receipt Quantity}/\textit{ASN} \text{ Quantity},$$

where Good Receipt Quantity is the number of units of a part received from a supplier and ASN Quantity is the number of units of the part indicated in the ASN from the supplier. For example, suppose 500 units of a Part B is indicated in the ASN from a Supplier H in July and 400 units of Part B is received from Supplier H. In this example, the ASN accuracy of Supplier H for July can be computed to be 0.8 (400÷500=0.8).

The supplier delivery accuracy of a supplier may be based on the quantity of a part received from the supplier within the estimated time of arrival (ETA) indicated for the part and the quantity of the part ordered from the supplier. The supplier delivery accuracy of a supplier can be computed as follows:

$$\text{Delivery Accuracy} = \text{Good Receipt } \textit{Qty} \text{ within } \textit{ETA}/\text{Purchase Order Quantity},$$

where Good Receipt Quantity Qty within ETA is the number of units of a part received from a supplier within the ETA and Purchase Order Quantity is the number of units of the part ordered from the supplier. For example, suppose 500 units of a Part C is ordered from a Supplier I in July and 350 units of Part C is received from Supplier I within the ETA indicated for Part C. In this example, the delivery accuracy of Supplier I for July can be computed to be 0.7 (350÷500=0.7).

Supplier analysis module 418 can generate supplier quality scores for the different suppliers. In some embodiments, for a particular supplier, supplier analysis module 418 can generate a supplier quality score of the supplier based on its supplier quality index, supplier ASN accuracy, supplier delivery accuracy, and combinations thereof. Supplier analysis module 418 can store (e.g., record) the supplier quality scores within data repository 428, where it can subsequently be retrieved and used.

According to one embodiment, supplier future investment may be based on an analysis of regional and global journals, articles, and other types of publications that provide analytical research data, such as BLOOMBERG and ISH MARKIT. The text from such publications can be analyzed to determine or infer future investments and investment strategies of a supplier. Supplier analysis module 418 can generate supplier future investment scores for the different suppliers based on the analysis. In some embodiments, for a particular supplier, supplier analysis module 418 can generate a supplier future investment score of the supplier based on the financial and investment information about the supplier contained in the publications. Supplier analysis module 418 can store (e.g., record) the supplier future investment scores within data repository 428, where it can subsequently be retrieved and used.

In some embodiments, supplier analysis module 418 may implement or include a machine learning (ML) model 432 to analyze text to understand (determine) the financial and investment information about the supplier in the text. ML model 432 can be trained using a corpus of publications that provide analytical research data, such as BLOOMBERG and ISH MARKIT. The text of the corpus of publications can be preprocessed using ML techniques and algorithms, such as TD-LSTM, to identify the words in the text that are indicative of business practices of suppliers, such as strategies, investments, financial health, and ethical behaviors. The identified words may include the keywords that influence prediction of business practices, including future investments of suppliers. The preprocessing may also include stemming of the words to their word stem, base, or root form. A document term matrix which describes the frequency of terms (e.g., the words that are indicative of business practices of suppliers) can be generated. A portion of an example document term matrix 600 that may be generated is illustrated in FIG. 6. As shown, in illustrative document term matrix 600, each row can represent a publication (or "document") within the corpus. Stemmed term/Original words can indicate a stemmed term that appears in a document. Risk/Opportunity can indicate whether the word(s) is indicative of risk or opportunity associated with the supplier. Correlation can be a weight that indicates the mutual relationship between the words and phrases. Term frequency (TF) can be computed by obtaining the column sum. Frequency analysis can be performed by summing the counts of each term and identifying the important terms. The document term matrix (e.g., document term matrix 600) can be used to train ML model 432. Once trained, ML model 432 can, in response to input of one or more publications (e.g., publications that provide analytical research data), predict a risk assessment of the future investments and investment strategies of a supplier. In some such embodiments, a supplier future investment score that is based on the predicted risk assessment of the future investments and investment strategies can be generated.

Referring again to FIG. 4, according to one embodiment, supplier position in the industry may be based on supplier health indicators such as financial health and ethical behavior. Supplier financial health and ethical behavior may be based on analysis of publications that provide analytical research data (e.g., analysis of BLOOMBERG and ISH MARKIT) and information provided by various certification authorities/bodies. The text from analytical research data publications can be analyzed to determine or infer the financial health of a supplier. Additionally, information from various certification authorities/bodies can be analyzed, for example, utilizing Natural Language Understanding (NLU) techniques, to determine or infer the ethical behavior of the supplier. Supplier analysis module 418 can generate supplier industry position scores for the different suppliers. In some embodiments, for a particular supplier, supplier analysis module 418 can generate a supplier industry position score of the supplier based on the inferred financial health and ethical behavior of the supplier. In some embodiments, ML model 432 may be utilized to predict a risk assessment of the financial health and ethical behavior of a supplier (e.g., predict a risk assessment of supplier position in the industry of a supplier). In some such embodiments, a supplier industry position score that is based on the predicted risk assessment of the financial health and ethical behavior can be generated. In embodiments, supplier analysis module 418 can store (e.g., record) the supplier industry position scores within data repository 428, where it can subsequently be retrieved and used.

Feature matching engine 420 is operable to match similar parts. For example, given a query part, feature matching engine 420 can identify, predict, or otherwise determine one or more existing parts that most closely match the query part. The query part may be a new part or an existing part. The matching may be based on a matching of the various features of the query part and the existing parts. In some embodiments, feature matching engine 420 can leverage a learning algorithm (e.g., k-nearest neighbor (k-NN) algorithm) and a distance similarity measure algorithm (e.g., Euclidean distance, Manhattan distance, or Minkowsiki distance) to determine a predetermined number of existing parts (e.g., k existing parts) that exactly or most closely match a query part (e.g., a new part or an existing part that is being matched). In such embodiments, the k-NN algorithm may be trained using machine learning techniques with a training dataset comprised of features of the various existing parts procured by the organization. For example, in one embodiment, the features of the existing parts may be stored or otherwise maintained in a table (e.g., a data structure). In the table, each row (e.g., record) may represent an instance of a training sample (e.g., a particular existing part) in the training dataset, and each column may show a different relevant feature of the training sample. That is, each record in the table may represent a particular existing part in the training dataset, and each column may contain a relevant feature of the existing part represented by the row in the table.

In more detail, as k-NN is a non-parametric, lazy learning algorithm, the k-NN algorithm does not make any assumptions on the underlying data and does not explicitly learn a model. Instead, the k-NN algorithm memorizes the training instances which are subsequently used as knowledge for the prediction phase. That is, the training phase of the k-NN algorithm comprises only of storing the training dataset (e.g., storing a table of features of the existing parts). For example, in one embodiment, feature matching engine 420 may store the training dataset within data repository 428.

The k-NN algorithm operates on the basic assumption that data points with similar classes are closer to each other. In other words, k-NN makes its selection based on the proximity to the other data points regardless of what feature the numerical values represent. For example, when relevant features of a query part are passed (e.g., input) for prediction of similar existing parts, k records of existing parts from the training dataset whose features most closely match the features of the query part can be located (e.g., identified). The identified existing parts can be output as a prediction of the most closely matching existing parts.

In some embodiments, Euclidean distance can be used as a distance measure to measure the similarity between the individual existing parts and the query part. In other embodiments, other measures of similarity, such as Manhattan distance or Minkowsiki distance, can be used as the distance measure. Euclidean distance (also known as 2-norm) is a straight-line distance between two vectors or datapoints (products). Unlike cosine similarity which uses the angle between two datapoints, Euclidean distance can be calculated by simply computing the square root of the sum of the squared differences between the two data points (vectors). The Euclidean distance algorithm may be expressed as follows:

$$\text{Euclidean distance} = \sqrt{\sum_{i}^{N}(x1_i - x2_i)^2},$$

where x1 is the first row of data, x2 is the second row of data, and i is the index to a specific column.

A smaller Euclidean distance value means that the two records representing the relevant features of two parts (e.g., an existing part and a query part) are more similar. A zero Euclidean distance means that both records are the same with all matching features. That is, a zero Euclidean distance means that both records are the same with all matching attributes and configurations. In response to an input of a record (e.g., a vector) representing relevant features of a query part for prediction, feature matching engine 420 can predict the k most closely matching existing parts based on the calculated distance between the received record and the individual records representing the relevant features of the existing parts in the training dataset.

Figure 7:
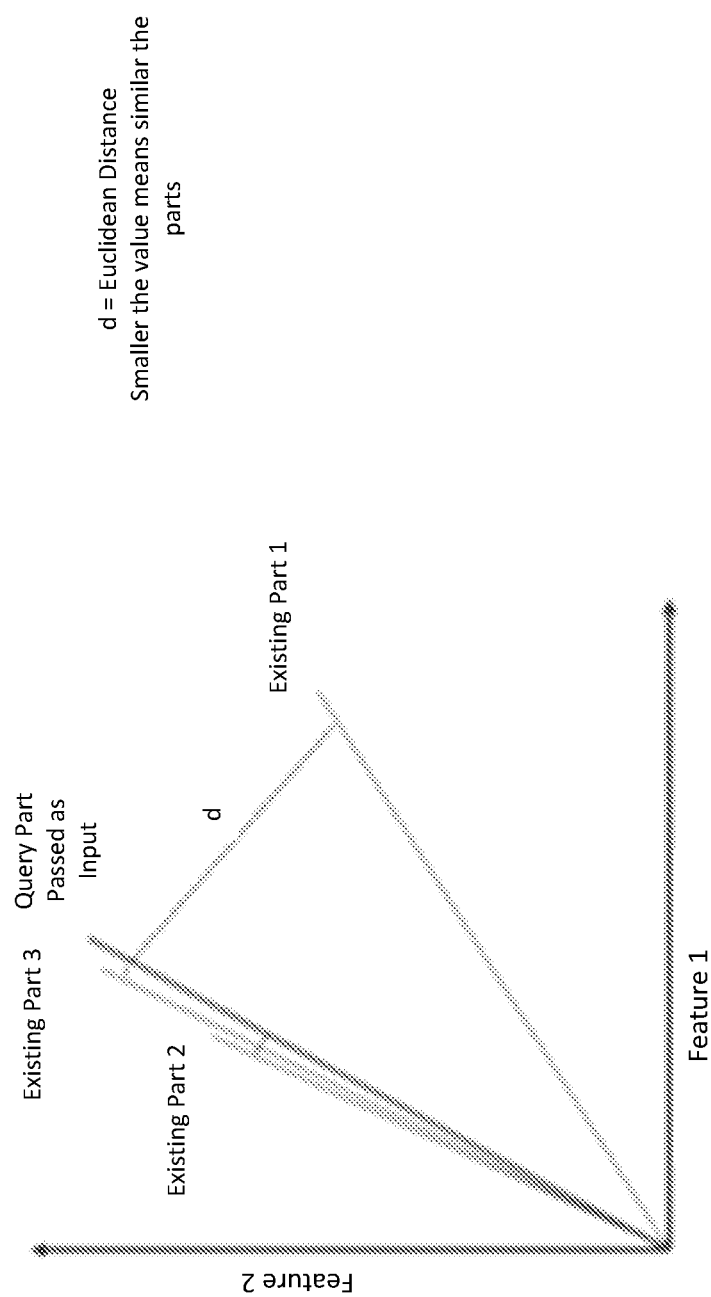
FIG. 7 is a diagram illustrating an example graph matching features of parts based on Euclidean distance.

For example, as shown in an illustrative graph 700 in FIG. 7, a distance (e.g., Euclidian distance) can be calculated between the record representing the query part ("Query Part Passed as Input") and each of the three records representing three existing parts ("Existing Part 1," "Existing Part 2," and "Existing Part 3") in the training dataset. Once the distances are calculated, the records in the training dataset can be sorted (or "ordered") based on their distance to the record representing the query part. In the example of FIG. 7, based on the calculated Euclidian distance, Existing Part 3 is nearest the Query Part Passed as Input, followed by Existing Part 2, and then Existing Part 1. Thus, of the three records in the training dataset, Existing Part 3 most closely matches the Query Part and Existing Part 1 least matches the Query Part. Based on the calculated distances (e.g., order in the training dataset), feature matching engine 420 can determine the k records (i.e., k instances) in the training dataset that are closest to the record representing the query part and output these records as the predicted k existing parts that most closely match the query part.

In some embodiments, the predicted number of most closely matching records (e.g., records representing existing parts), k, may be configured as a hyperparameter and tuned as part of hyperparameter tuning to improve performance of the k-NN model. For example, the value of k may be set to N to cause feature matching engine 420 to predict the top N (e.g., N=2, 3, 4, or any other suitable number) most closely matching existing parts. The value of N may be configurable by the organization. In some embodiments, the predicted top N existing parts may be returned or otherwise provided in a response to a request for matching existing parts.

Referring again to FIG. 4, procurement behavior module 422 can generate part quality and readiness scores for the different existing parts. In one embodiment, for a particular existing part, procurement behavior module 422 can generate a part quality and readiness score by aggregating (e.g., averaging) the part quality score, the part lifecycle score, the part consumption score, and the customer feedback score of the existing part. In some embodiments, procurement behavior module 422 may utilize part analysis module 416 to determine part quality scores, part lifecycle scores, part consumption scores, and customer feedback scores of the existing parts. In some embodiments, procurement behavior module 422 may retrieve one or more of the part quality scores, part lifecycle scores, part consumption scores, and customer feedback scores of the existing parts from data repository 428. In some embodiments, procurement behavior module 422 may apply predetermined weights to the part quality score, the part lifecycle score, the part consumption score, and the customer feedback score when generating a part quality and readiness score of an existing part. The respective weights applied to the different scores may indicate the relative importance of the different scores in computing the part quality and readiness score. The different weights can, for example, be configured as an organizational policy or a user preference.

Procurement behavior module 422 can also generate supplier trust and opportunity scores for the different suppliers. In one embodiment, for a particular supplier, procurement behavior module 422 can generate a supplier trust and opportunity score by aggregating (e.g., averaging) the supplier quality score, the supplier future investment score, and the supplier industry position score of the supplier. In some embodiments, procurement behavior module 422 may utilize supplier analysis module 418 to determine supplier quality scores, supplier future investment scores, and supplier industry position scores of the suppliers. In some embodiments, procurement behavior module 422 may retrieve one or more of the supplier quality scores, the supplier future investment scores, and the supplier industry position scores of the suppliers from data repository 428. In some embodiments, procurement behavior module 422 may apply predetermined weights to the supplier quality score, the supplier future investment score, and the supplier industry position score when generating a supplier trust and opportunity score of a supplier. The respective weights applied to the different scores may indicate the relative importance of the different scores in computing the supplier trust and opportunity score. The different weights can, for example, be configured as an organizational policy or a user preference.

Procurement dynamics analysis module 424 is operable to determine an optimal procurement decision by simulating supply chain behavior resulting from changes to the procurement attributes. In some embodiments, in response to input of an existing part, a quantity of the existing part to be procured, and one or more candidate suppliers for procurement of the existing part, procurement dynamics analysis module 424 can generate potential procurement decisions for procuring the specified quantity of existing parts from one or more of the candidate suppliers. Starting with one of the potential procurement decisions and progressing to each of the other potential procurement decisions, procurement dynamics analysis module 424 can observe the behaviors of the relationships between the existing part, candidate suppliers, and inventory resulting from the different potential procurement decisions. That is, procurement dynamics analysis module 424 can observe the impact on the relationships between the existing part, candidate suppliers, and inventory resulting from the different potential procurement decisions. The relationship between the existing part and candidate supplier may include relationships between part variables (e.g., part cost, part lifecycle, part availability, part consumption, and part customer feedback) and supplier variables (e.g., supplier capacity, supplier financial health, and supplier ethical behavior). The part variables and the supplier variables are also referred to herein as "procurement variables." The processing by procurement dynamics analysis module 424 can be thought of as or akin to "what-if analysis" or "causal loop analysis." The potential procurement decision that is most favorable to the organization based on the observed behaviors of the relationships between the existing part, candidate suppliers, and inventory can be determined as the optimal procurement decision.

By way of a simple example, suppose procurement dynamics analysis module 424 determines that a potential procurement decision is to procure 400 units of a Part A from a Supplier M. Procurement dynamics analysis module 424 can then simulate the impact of this potential procurement decision on the various procurement variables and relationships between the various procurement variables—e.g., what is the impact to the inventory of Part A; what is the impact to Supplier M (e.g., impact to Supplier M's capacity, financial health, and/or ethical behavior) if 400 units of Part A are procured from Supplier M; and so on. Procurement dynamics analysis module 424 can then change one or more procurement attributes—e.g., change one or more attributes of the potential procurement decision to procure 400 units of a Part A from Supplier M—and simulate the impact of the potential procurement decision with the changed attributes. Continuing the example above, changing one or more procurement attributes may result in another potential procurement decision to procure 300 units of Part A from Supplier M and 100 units of Part A from a Supplier N. Procurement dynamics analysis module 424 can then simulate the impact of this other potential procurement decision on the various procurement variables and relationships between the various procurement variables. Procurement dynamics analysis module 424 can repeat this process for other potential procurement decisions. Procurement dynamics analysis module 424 can identify the potential procurement decision that is most favorable to the organization (e.g., least negative impact to the organization) based on the simulations as the optimal procurement decision.

Figure 8:
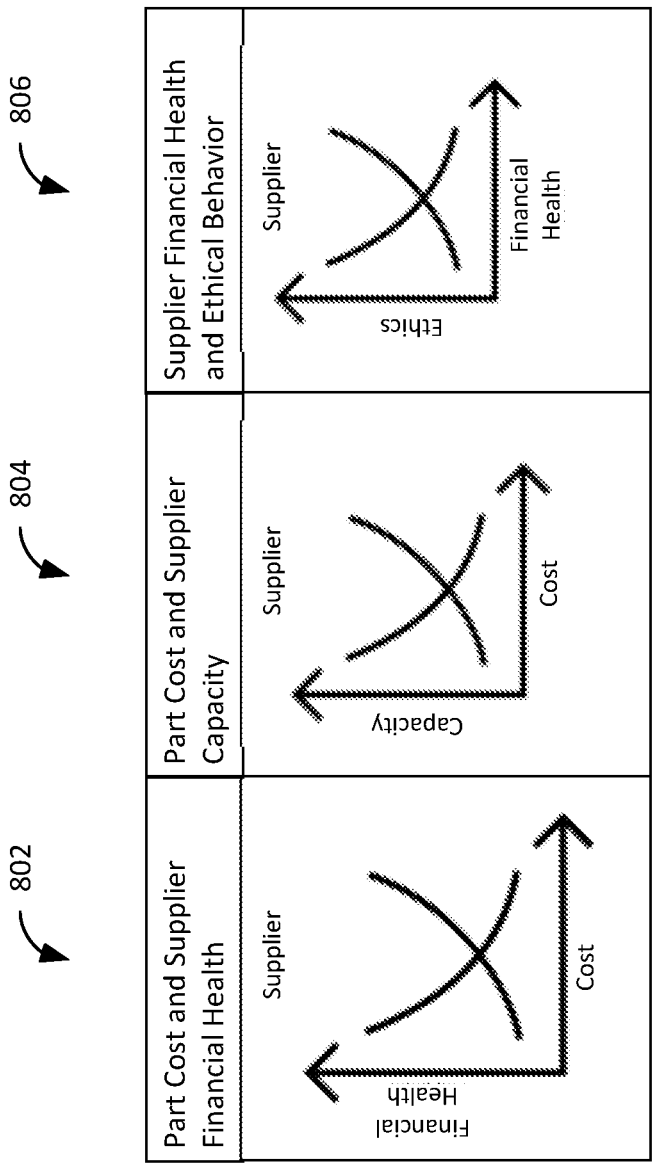
FIG. 8 is a diagram illustrating example trend curves representing procurement variables, in accordance with an embodiment of the present disclosure.

In some embodiments, procurement dynamics analysis module 424 may utilize trending curves (also known as "trend curves") to analyze the behaviors of the procurement variables. For instance, each procurement variable can be plotted in a trending curve that represents the procurement variable. The relationship between two procurement variables, such as between part cost and supplier financial health, part cost and supplier capacity, supplier financial health and supplier ethical behavior, part consumption and part cost, and part cost and part feedback, to provide only a few examples, can be determined from the intersections of the trending curves that represent the two procurement variables. For example, as illustrated in FIG. 8, relationship between part cost and supplier financial health can be determined from the intersection of their representative trending curves. Indicated by reference numeral 802 in FIG. 8. The relationship between part cost and supplier capacity can be determined from the intersection of their representative trending curves. Indicated by reference numeral 804 in FIG. 8. The relationship between supplier financial health and supplier ethical behavior can be determined from the intersection of their representative trending curves. Indicated by reference numeral 806 in FIG. 8. The relationships and representative trending curves shown in FIG. 8 is merely illustrative and is not intended to depict a complete set of relationships and representative trending curves. The intersections of the trending curves can be determined by analyzing the procurement variables. The metrics of the different procurement variables can be aggregated and used in determining an optimal procurement decision. For example, for a procurement of 400 units of Part A, an optimal procurement decision may be to procure 200 units of Part A from Supplier W, 100 units of Part A from Supplier X, and 100 units of Part A from Supplier Y.

Referring again to FIG. 4, procurement recommendation module 426 is operable to recommend a procurement decision for a procurement of parts. In some embodiments, in response to a request for a procurement recommendation for procuring a quantity of a part being received by procurement service 408, procurement recommendation module 426 can process the received request and provide a recommendation of a procurement decision for procuring the specified quantity of the part. In particular, according to one embodiment, procurement recommendation module 426 can identify one or more existing parts that closely match the part specified in the request. The part specified in the request may be an existing part or a new part. In the case where the part is an existing part, there is likely to be one existing part that matches the part. In the case where the part is a new part, one or more existing parts that most closely match the part can be identified. In some embodiments, procurement recommendation module 426 can utilize feature matching engine 420 to determine one or more existing parts that closely match the part. For example, procurement recommendation module 426 can send a request to feature matching engine 420 for matching existing parts.

Procurement recommendation module 426 can then determine part quality and readiness scores for the identified existing parts that closely match the part. Procurement recommendation module 426 can identify the suppliers that supplied the closely matching existing parts and determine supplier trust and opportunity scores for these suppliers. The suppliers that supplied the closely matching existing parts can be identified from records, such as purchase order records, maintained by the organization about past procurements of existing parts. In some embodiments, procurement recommendation module 426 can utilize procurement behavior module 422 to generate the part quality and readiness scores and the supplier trust and opportunity scores. For example, procurement recommendation module 426 can send a request to procurement behavior module 422 that causes procurement behavior module 422 to generate and return the part quality and readiness scores and the supplier trust and opportunity scores.

In some embodiments, procurement recommendation module 426 can filter any low performing closely matching existing parts. For example, procurement recommendation module 426 can filter the closely matching existing parts whose part quality and readiness score does not satisfy a part quality threshold. The part quality threshold may be configurable by the organization. In some embodiments, procurement recommendation module 426 can filter any low performing suppliers. For example, procurement recommendation module 426 can filter the suppliers whose supplier trust and opportunity score does not satisfy a supplier quality threshold. The supplier quality threshold may be configurable by the organization.

Procurement recommendation module 426 can then determine potential procurement decisions for procuring the specified quantity of the part. The potential procurement decisions may be based on the existing parts and the suppliers that satisfy the part quality threshold and the supplier quality threshold, respectively. Procurement recommendation module 426 can then determine an optimal one of the potential procurement decisions and recommend the optimal potential procurement decision as an optimal procurement decision for procuring the specified quantity of the part. In some embodiments, procurement recommendation module 426 can utilize procurement dynamics analysis module 424 to determine the optimal procurement decision. Procurement recommendation module 426 can then send the optimal procurement decision in a response to the request for a procurement recommendation.

Figure 9:
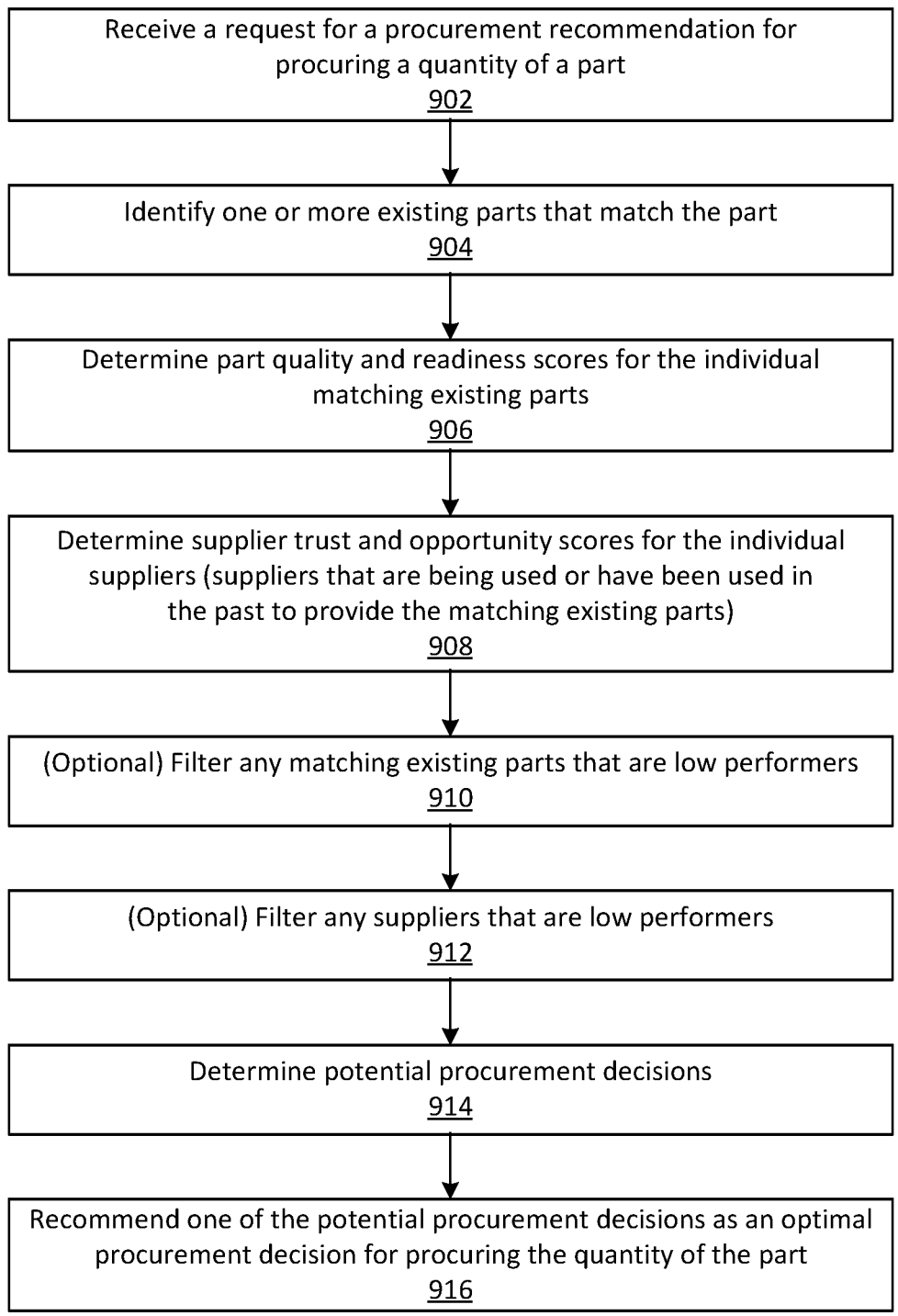
FIG. 9 is a flow diagram of an example process for providing an efficacious procurement recommendation for a procurement of a quantity of a part, in accordance with an embodiment of the present disclosure.

FIG. 9 is a flow diagram of an example process 900 for providing an efficacious procurement recommendation for a procurement of a quantity of a part, in accordance with an embodiment of the present disclosure. Illustrative process 900 may be implemented, for example, within system 400 of FIG. 4. In more detail, process 900 may be performed, for example, in whole or in part by part analysis module 416, supplier analysis module 418, feature matching engine 420, procurement behavior module 422, procurement dynamics analysis module 424, and procurement recommendation module 426, or any combination of these including other components of system 400 described with respect to FIG. 4.

With reference to process 900 of FIG. 9, at 902, a request for a procurement recommendation for procuring a quantity of a part may be received. For example, the request may be received from a client application (e.g., client application 406) on a client device (e.g., client 402).

At 904, one or more existing parts that match the part specified in the request may be identified. The identified existing part may be an existing part that exactly matches the part, for example, in the case where the part specified in the request is an existing part. The identified one or more existing parts may be existing parts that most closely match the part, for example, in the case where the part specified in the request is a new part.

At 906, part quality and readiness scores for the existing parts identified at 904 may be determined. The part quality and readiness scores are indicative of the quality of the existing parts.

At 908, supplier trust and opportunity scores for the suppliers may be determined. These suppliers are the suppliers of the existing parts identified at 904. The suppliers can be determined from records of past procurements of the existing parts. The supplier trust and opportunity scores are indicative of the quality of the suppliers.

At 910, any closely matching existing parts that are low performers may be optionally filtered. The low performing existing parts are the existing parts whose part quality and readiness score does not satisfy a part quality threshold.

At 912, any suppliers that are low performers may be optionally filtered. The low performing suppliers are the suppliers whose supplier trust and opportunity score does not satisfy a supplier quality threshold.

At 914, one or more potential procurement decisions for procuring the quantity of the part specified in the request may be determined. The potential procurement decisions include procurement decisions to procure the specified quantity of the existing parts that match or closely match the part from the suppliers of the existing parts. In some embodiments, the procurement decisions to procure the specified quantity of the existing parts that match or closely match the part from the suppliers of the existing parts may be based on the part quality and readiness score for each of the one or more existing parts and the supplier trust and opportunity score for each of the one or more suppliers. For example, the existing parts can include the existing parts whose part quality and readiness score satisfies the part quality threshold, and the suppliers can include the suppliers whose supplier trust and opportunity score satisfies the supplier quality threshold.

At 916, one of the potential procurement decisions may be recommended as an optimal procurement decision for procuring the quantity of the part specified in the request. The recommended procurement decision may be a potential procurement decision that is optimal based on simulations of the impact of the one or more potential procurement decisions, as previously described herein. The optimal procurement decision may then be sent in a response to the request for the procurement recommendation.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
    training a Target Dependent Long Short-Term Memory (TD-LSTM) model to understand sentiment conveyed in text by continuously learning features directly from training data while capturing intricate relatedness among a target, context, and dependent words;
    responsive to a request for a procurement recommendation for procuring a quantity of a part, by a computing device:
    identifying one or more existing parts that match the part;
    analyzing customer feedback using the trained ML model to determine sentiment conveyed toward the one or more existing parts;
    determining a part quality and readiness score for each of the one or more existing parts, the part quality and readiness score based on a part quality score, a part lifecycle score, a part consumption score, and a customer feedback score, wherein the feedback score is at least partially based on the sentiment;
    identifying one or more suppliers of the one or more existing parts;
    determining a supplier trust and opportunity score for each of the one or more suppliers, the supplier trust and opportunity score based on a supplier quality score, a supplier future investment score, and a supplier industry position score;
    determining one or more potential procurement decisions for procuring the quantity of the part, wherein the one or more potential procurement decisions include procurement decisions to procure the specified quantity of the one or more existing parts from the one or more suppliers based on the part quality and readiness score for each of the one or more existing parts and the supplier trust and opportunity score for each of the one or more suppliers;
    executing a causal loop simulation of the one or more potential procurement decisions;
    recommending one of the one or more potential procurement decisions based on the causal loop simulation as an optimal procurement decision for procuring the quantity of the part.

2. The method of claim 1, wherein the part is an existing part.

3. The method of claim 1, wherein the part is a new part that is not an existing part.

4. The method of claim 1, wherein the part quality and readiness score is based on an average of the part quality score, the part lifecycle score, the part consumption score, and the customer feedback score.

5. The method of claim 4, further comprising filtering the one or more existing parts based on the part quality and readiness score and a part quality threshold.

6. The method of claim 1, wherein the supplier trust and opportunity score is based on an average of the supplier quality score, the supplier future investment score, and the supplier industry position score.

7. The method of claim 6, further comprising filtering the one or more suppliers based on the supplier trust and opportunity score and a supplier quality threshold.

8. The method of claim 1, further comprising:
    training a machine learning (ML) model using a document term matrix to understand financial and investment information in text; and
    analyzing analytical research data publications using the trained ML model to predict a risk assessment of each of the one or more suppliers, wherein the risk assessment is used in determining the supplier trust and opportunity score.

9. The method of claim 8, further comprising using the trained ML model to predict an ethical behavior of each of the one or more suppliers, wherein the ethical behavior is used in determining the supplier trust and opportunity score.

10. The method of claim 8, wherein the ML model includes a Target Dependent Long Short-Term Memory (TD-LSTM) model.

11. The method of claim 1, wherein identifying one or more existing parts is by applying a learning algorithm and a distance measure.

12. The method of claim 11, wherein the learning algorithm includes a k-nearest neighbor (k-NN) algorithm and the distance measure include a Euclidean distance.

13. The method of claim 1, wherein the causal loop simulation includes simulating an impact of the one or more potential procurement decisions on procurement variables and relationships between the procurement variables.

14. A computing device comprising:
    one or more non-transitory machine-readable mediums configured to store instructions; and
    one or more processors configured to execute the instructions stored on the one or more non-transitory machine-readable mediums, wherein execution of the instructions causes the one or more processors to carry out a process comprising:
    training a Target Dependent Long Short-Term Memory (TD-LSTM) model to understand sentiment conveyed in text by continuously learning features directly from training data while capturing intricate relatedness among a target, context, and dependent words;
    receiving a request for a procurement recommendation for procuring a quantity of a part;
    identifying one or more existing parts that match the part;
    determining a part quality and readiness score for each of the one or more existing parts, the part quality and readiness score based on a part quality score, a part lifecycle score, a part consumption score, and a customer feedback score;
    identifying one or more suppliers of the one or more existing parts;
    analyzing customer feedback using the trained ML model to determine sentiment conveyed toward the one or more existing parts;
    determining a supplier trust and opportunity score for each of the one or more suppliers, the supplier trust and opportunity score based on a supplier quality score, a supplier future investment score, and a supplier industry position score, wherein the feedback score is at least partially based on the sentiment;
    determining one or more potential procurement decisions for procuring the quantity of the part, wherein the one or more potential procurement decisions include procurement decisions to procure the specified quantity of the one or more existing parts from the one or more suppliers based on the part quality and readiness score for each of the one or more existing parts and the supplier trust and opportunity score for each of the one or more suppliers;

executing a causal loop simulation of the one or more potential procurement decisions; and recommending one of the one or more potential procurement decisions based on the causal loop simulation as an optimal procurement decision for procuring the quantity of the part.

15. The computing device of claim 14, wherein the process further comprises:

training a machine learning (ML) model using a document term matrix to understand financial and investment information in text; and analyzing analytical research data publications using the trained ML model to predict a risk assessment of each of the one or more suppliers, wherein the risk assessment is used in determining the supplier trust and opportunity score.

16. The computing device of claim 15, wherein the process further comprises using the trained ML model to predict an ethical behavior of each of the one or more suppliers, wherein the ethical behavior is used in determining the supplier trust and opportunity score.

17. A non-transitory machine-readable medium encoding instructions that when executed by one or more processors cause a process to be carried out, the process including:

training a Target Dependent Long Short-Term Memory (TD-LSTM) model to understand sentiment conveyed in text by continuously learning features directly from training data while capturing intricate relatedness among a target, context, and dependent words;

receiving a request for a procurement recommendation for procuring a quantity of a part;

identifying one or more existing parts that match the part;

analyzing customer feedback using the trained ML model to determine sentiment conveyed toward the one or more existing parts;

determining a part quality and readiness score for each of the one or more existing parts, the part quality and readiness score based on a part quality score, a part lifecycle score, a part consumption score, and a customer feedback score, wherein the feedback score is at least partially based on the sentiment;

identifying one or more suppliers of the one or more existing parts;

determining a supplier trust and opportunity score for each of the one or more suppliers, the supplier trust and opportunity score based on a supplier quality score, a supplier future investment score, and a supplier industry position score;

determining one or more potential procurement decisions for procuring the quantity of the part, wherein the one or more potential procurement decisions include procurement decisions to procure the specified quantity of the one or more existing parts from the one or more suppliers based on the part quality and readiness score for each of the one or more existing parts and the supplier trust and opportunity score for each of the one or more suppliers; and executing a causal loop simulation of the one or more potential procurement decisions;

recommending one of the one or more potential procurement decisions based on the causal loop simulation as an optimal procurement decision for procuring the quantity of the part.

* * * * *